May 27, 1947. M. A. MOELLER 2,421,349
PRESSURE MODULATING DEVICE FOR STONE SAWS
Filed March 26, 1946
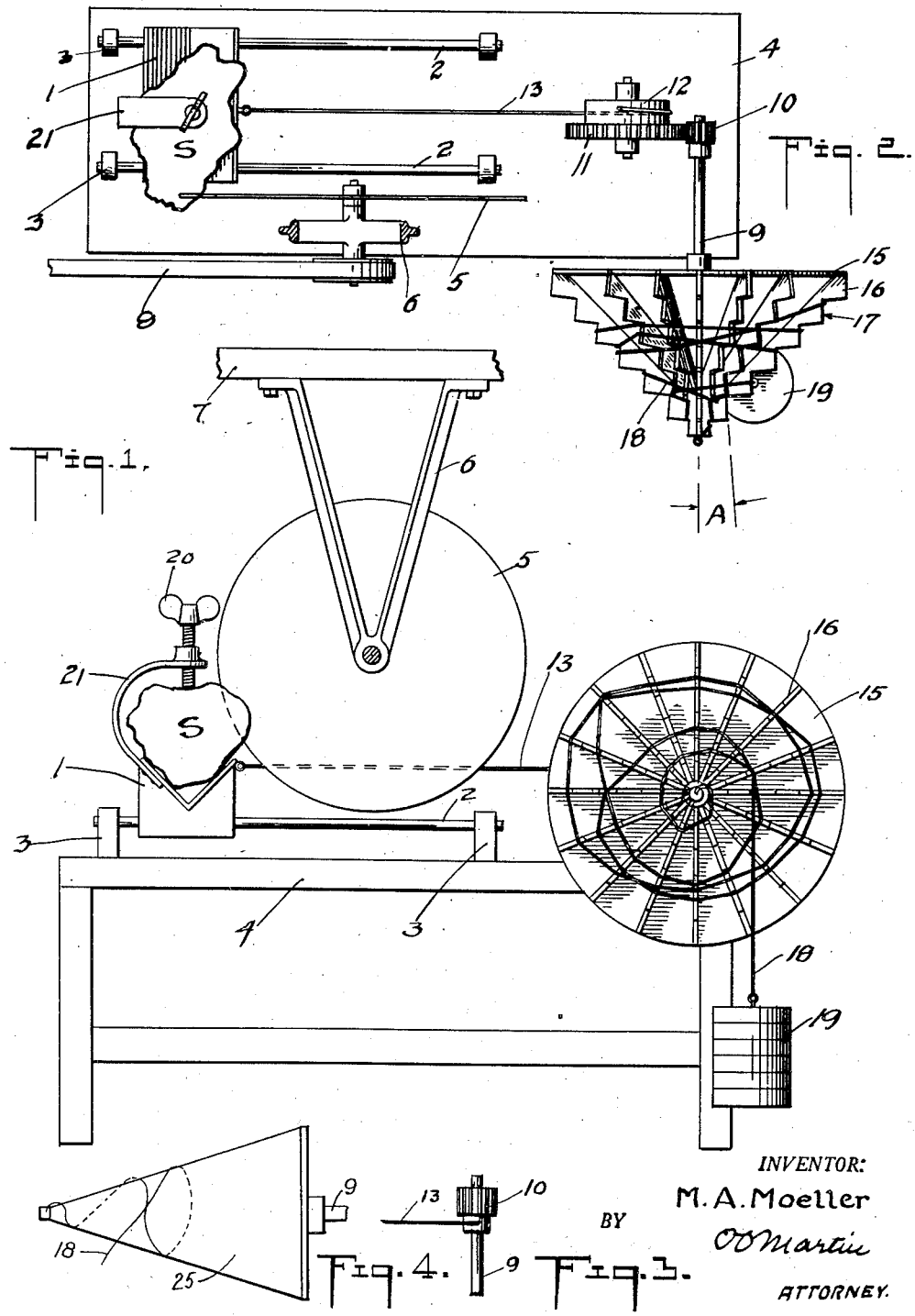
INVENTOR:
M. A. Moeller
BY OO Martin
ATTORNEY.

Patented May 27, 1947

2,421,349

UNITED STATES PATENT OFFICE 2,421,349

PRESSURE MODULATING DEVICE FOR STONE SAWS

Morris A. Moeller, Long Beach, Calif.

Application March 26, 1946, Serial No. 657,203

10 Claims. (Cl. 125—13)

This invention relates to a device for cutting precious and semi-precious stones and has particular reference to means for regulating the pressure between the stone to be cut and the saw by means of which the cutting is effected to correspond to variations in the shape of the stone.

The stones to be cut vary considerably in size and shape and are usually very irregular in shape, but the machines commonly used for cutting the stones are constructed to apply uniform pressure against the stone throughout a cut the result being that the resistance offered by the stone to the advance of the saw varies considerably and that for this reason a uniformly smooth and even cut is not produced and that the wear on the saw is excessive at places of small contact.

Having the foregoing conditions in view, it is the object of my invention to provide a feeding device for a stone cutting machine which, within reasonable limits, may be adjusted and set to vary the pressure between the stone and saw to correspond to variation in the peripheral contact as the saw passes through the irregular shape of the stone. To this end the invention resides in the combinations hereinafter described in detail and illustrated in the accompanying drawings, of which:

Fig. 1 is a side elevational view of a device embodying the invention with parts hereof broken away as shown;

Fig. 2 is a substantially corresponding plan view of the device;

Fig. 3 is a detail view showing a modified method of interconnecting the component parts of the device; and Fig. 4 illustrates a modified form of rotatable member forming part of the device.

As illustrated in the drawings, a stone support 1 is mounted to slide on guides 2, and the latter are suitably supported in studs 3 of a table 4. Above the table is hung a saw 5, in a bracket 6 which, in turn, is shown mounted on the stationary member 7, which may be part of a framework mounted on the table or a ceiling beam, as found most suitable. The saw is rotatable in any convenient manner, as by a belt 8 extending to a prime mover (not shown). A shaft 9 is shown mounted in bearings at the opposite end of the table and a gear pinion 10 is secured to the end of this shaft. This pinion is in permanent mesh with a large gear wheel 11, to which is secured a pulley 12, and a cord or band 13 extends from this pulley to the stone support 1. The aforenamed connections are illustrative of means for moving the stone support the short distance required to complete the cutting operation thereof in response to the number of rotations of the shaft which may be required for the purpose of the invention, as will now be more fully explained.

A cone-shaped frame 15 is secured to the opposite end of this shaft and it consists of a series of bars 16 radiating from the apex of the cone or as close thereto as space is found available and equidistantly extending along the peripheral surface thereof. These bars are all identically shaped and symmetrically mounted on the cone, but as stated, for lack of space, may not all reach the apex of the cone. The outer surfaces of the bars are notched by cutting a uniform series of substantially 90° notches therein, and it is important to note that the bottom surfaces 17 of these notches are not parallel with the axes of the cone but set off slightly at an acute angle relatively thereto, substantially as indicated at A. A cord 18 is attached to the frame at the apex thereof and a weight 19 is fastened to the outer free end of this cord.

In operation the stone S is placed in the support 1 in proper lateral relation to the saw 5, and it is clamped in position therein in any suitable manner, as by means of a screw 20 mounted in a bracket 21 of the support. The cord 13 is thereupon extended from the support to the pulley 12, whereupon the cord 18 is wound around the cone 15 in such a manner that the pressure exerted by the counter-weight 19 at all times will hold a predetermined uniform pressure relation to the width of the portion of the stone to be cut. This result can be attained only by studying the shape of the portion of the stone to be transversed by the saw and to move the cord 18 back and forth in the notches correspondingly.

Further to explain this operation, it is to be noted that, when the cord 18 depends directly from the apex of the frame, the force of the suspended weight 19 has no power to urge rotation of the frame but that, as the cord is moved from notch to notch toward the opposite, large end of the frame, gradually increasing pull is exerted tending to rotate the frame. The operator may therefore, as he studies the variations in the progressive width of the cut to be made, move the cord to seat in the succession of notches in the bars representing radii over which pull is exerted most nearly corresponding to the variations in the width of the surface to be cut.

It is seen from the foregoing that I have provided a very simple and conveniently operable device for modulating the pressure of a saw against the stone to be cut. I do not, however, wish to be limited to the exact proportion and arrangements of parts illustrated, but reserve the right to embody modifications within the scope of the claims hereto appended.

It may, for example, be possible where sufficient space is available, to increase the length of the frame 15 to such an extent that the notches 17 may not be required, but it may be possible to use a solid cone 25, on the surface of which the cord 18 may be wound as required for the operation of the device. It may also, in cases where the movement of stone support past the saw is relatively short, be possible to extend the cord 13 directly from the shaft 9 to the stone support, substantially as indicated in Fig. 3. If the pinion 10 should be found left on the shaft, as shown, and in case a slightly increased movement of the stone is required, there would be no objection to winding the cord on the pinion.

I claim:

1. In a stone cutting device, in combination with a saw and a stone support movable relative to said saw, a pressure modulating device comprising a rotary cone-shaped frame, connections from said frame to said stone support to move the latter relative to the saw in response to rotation of the frame, a cord attached to said frame having a counter-weight on the free end of said cord, the peripheral surface of the frame having therein a series of annular stepped notches within which said cord is wound back and forth, thereby to cause the counter-weight to apply pressure to rotate the frame corresponding to variations in the radial distance of the cord from the axis of the frame.

2. In combination with a saw and a stone support movable relative thereto, a shaft, a pulley, a band extending from said stone support to said pulley, speed reducing connections between said shaft and said pulley, means rotatable with said shaft to advance said stone support past said saw, a counter-weight, and a cord extending from said counter-weight and mountable on said rotatable means.

3. A pressure modulating device for a stone cutting machine comprising, a shaft, means extending from said shaft to the stone to be cut for moving the latter in response to rotation of the shaft, a cone-shaped frame on said shaft consisting of an equidistant series of bars extending from the apex of the cone to the base thereof, said bars being notched to form a uniform series of annular grooves on the cone, a cord extending from the apex thereof, a counter-weight attached to the free end of said cord, the cord being wound about the cone and seated in notches of the bars a radial distance from the frame axis corresponding to variations in the size of the portion of the stone to be cut.

4. A pressure modulating device for a stone cutting machine comprising, a shaft, means extending from said shaft to the stone to be cut for moving the latter in response to rotation of the shaft, speed reducing gearing embodied in said means, a cone-shaped frame on said shaft consisting of an equidistant series of bars extending from the apex of the cone to the base thereof, said bars being notched to form a uniform series of annular grooves on the cone, a cord extending from the apex thereof, a counter-weight attached to the free end of said cord, the cord being wound about the cone and seated in notches of the bars a distance from the frame axis corresponding to variations in the shape of the portion of the stone to be cut.

5. A pressure modulating device including a cone-shaped frame made from a series of bars equidistantly extending from the apex of the cone to the base thereof, the outer surfaces of said bars being notched to provide a series of annular grooves in the frame of uniformly increasing diameter extending from the apex thereof to the base, the bottoms of said grooves being slightly inclined relative to the axis of the frame and inwardly directed from the apex end of the frame, a counter-weight, a cord extending from the apex of the cone to said counter-weight, the cord being wound around the frame to seat in notches thereof, pressure produced by the weight of the counter-weight causing the frame to rotate.

6. A stone cutting machine, a saw, a stone support movable past such saw, a shaft, a pulley, a band extending from said pulley to said stone support, speed reducing devices between the shaft and the pulley, a frame rotatable with said shaft, said frame consisting of a series of bars equidistantly mounted on the frame and extending from the apex of the frame to the base thereof, a series of substantially right-angular notches in the outer surface of said bars, the bottoms of said notches being slightly inclined relative to the axis of the frame so as to intersect the said axis at a point behind the base of the frame, a cord extending from the apex of the frame, a counter-weight on the free end of said cord, the cord being wound about the frame to seat in notches, the radii of which hold a certain predetermined relation to the width of surface being cut by the saw as the frame is rotated by pressure of the counter-weight to advance the stone support past the saw.

7. In combination with a tool and a support for work to be cut by said tool, a base, a conical member mounted for rotation on said base, a connection from said member to the said work support to move the latter relative to the tool in response to rotation of the member, a weight, a cord extending from the apex of the member to said weight, said cord being wound back and forth on the cone as required for the force exerted by the weight urging rotation of the member to produce pulls on said support varying to correspond to variations in the size of cut being made.

8. In combination with a tool and a support for work to be cut by said tool, a base, a conical member mounted for rotation on said base, a connection from said member to the said support to move the latter relative to the tool in response to rotation of the member, speed reducing gearing in said connection, a weight, a cord extending from the apex of the member to said weight, said cord being wound back and forth on the cone as required for the force exerted by the weight urging rotation of the member to produce pulls on said support varying to correspond to variations in the size of cut being made.

9. In combination with a saw and a stone support movable relative thereto, a shaft, a pulley, a band extending from said stone support to said pulley, connections between said shaft and said pulley, means rotatable with said shaft to advance said stone support past said saw, power means, and a cord extending from said power means to said shaft and windable on said rotatable means to urge rotation thereof.

10. In combination with a tool and a support for work to be cut by said tool, a base, a conical member mounted for rotation on said base, a connection from said member to the said work support to move the latter relative to the tool in response to rotation of the member, power means, and a cord extending from the apex of the member to said power means, said cord being wound back and forth on the cone as required for the force exerted by said power means urging rotation of the member to produce pulls on said support varying to correspond to variations in the size of cut being made.

MORRIS A. MOELLER.

REFERENCES CITED

The following references are of record in the file of this patent:

UNITED STATES PATENTS

| Number | Name | Date |
|---|---|---|
| 1,261,669 | Wright | Apr. 2, 1918 |
| 1,976,164 | Fitton et al. | Oct. 9, 1934 |
| 2,318,050 | Boynton | May 4, 1943 |